US010164507B2

(12) United States Patent
Romero-Beltran et al.

(10) Patent No.: US 10,164,507 B2
(45) Date of Patent: Dec. 25, 2018

(54) SINGLE-PHASE SHADED POLE INDUCTION MOTOR, CONVERTIBLE TO PERMANENT MAGNET MOTOR

(76) Inventors: Julián Romero-Beltran, Mexico City (MX); Rodrigo Romero-Pérez, Mexico City (MX)

(*) Notice: Subject to any disclaimer, the term of this patent is extended or adjusted under 35 U.S.C. 154(b) by 189 days.

(21) Appl. No.: 14/420,480

(22) PCT Filed: Aug. 9, 2012

(86) PCT No.: PCT/IB2012/001540
§ 371 (c)(1),
(2), (4) Date: Sep. 4, 2015

(87) PCT Pub. No.: WO2014/023991
PCT Pub. Date: Feb. 13, 2014

(65) Prior Publication Data
US 2015/0372574 A1 Dec. 24, 2015

(51) Int. Cl.
*H02K 17/10* (2006.01)
*H02K 5/00* (2006.01)
(Continued)

(52) U.S. Cl.
CPC ............. *H02K 17/10* (2013.01); *H02K 1/148* (2013.01); *H02K 1/27* (2013.01); *H02K 3/18* (2013.01);
(Continued)

(58) Field of Classification Search
CPC .. H02K 15/0006; H02K 17/10; H02K 17/165; H02K 1/148; H02K 1/27;
(Continued)

(56) References Cited

U.S. PATENT DOCUMENTS 4,055,094 A * 10/1977 Menke ................... B23Q 11/08
29/596
4,309,635 A * 1/1982 Sei ........................ H02K 17/165
310/125
(Continued)

FOREIGN PATENT DOCUMENTS

CN       201167268 Y  * 12/2008
EP          2053722 A2 *  4/2009  ............ H02K 1/146
(Continued)

*Primary Examiner* — Alex W Mok
(74) *Attorney, Agent, or Firm* — Browdy and Neimark, P.L.L.C.

(57) ABSTRACT

The present invention refers to a shaded-pole single-phase motor convertible into a permanent magnet motor of the type that comprises a front casing, a stator element, a rotor element, a plurality of windings placed over the protruding poles of the stator element, and a rear casing, wherein the stator element presents a square-shape configuration with the four protruding poles rotated 45° relative to the horizontal and vertical symmetry axes in order to be aligned with the four corners of the stator element.

The stator new configuration enables optimizing the use of lamination material during manufacturing and assembling the sheet packages of the stator element and rotor element; furthermore, the protruding poles, by being rotated 45° in the stator element, enable a reduction of electric losses in its windings and a decrease in the operative temperature of both the stator element and the rotor element, which enables an increase of the motor operation efficiency. Similarly, the reduction of the operative temperature of the stator element allows the use of plastic materials for its components.

20 Claims, 11 Drawing Sheets

(51) Int. Cl.
*H02K 3/18* (2006.01)
*H02K 11/00* (2016.01)
*H02K 1/27* (2006.01)
*H02K 17/16* (2006.01)
*H02K 21/16* (2006.01)
*H02K 1/14* (2006.01)
*H02K 15/00* (2006.01)

(52) U.S. Cl.
CPC .............. *H02K 5/00* (2013.01); *H02K 17/165* (2013.01); *H02K 21/16* (2013.01); *H02K 15/0006* (2013.01)

(58) Field of Classification Search
CPC ............ H02K 21/16; H02K 3/18; H02K 5/00; H02K 11/0021
USPC ............................ 310/68 B, 156.01, 198, 91
See application file for complete search history.

(56) References Cited

U.S. PATENT DOCUMENTS

| | | | | |
|---|---|---|---|---|
| 6,439,497 B1 * | 8/2002 | Backlund | ............. | H02K 15/085 242/430 |
| 6,930,428 B2 * | 8/2005 | Grundl | ..................... | H02K 1/06 310/216.008 |
| 7,633,194 B2 * | 12/2009 | Dawsey | ................... | H02K 1/20 310/57 |
| 2008/0095624 A1 * | 4/2008 | Lewke | ..................... | F03D 80/30 416/146 R |
| 2009/0115282 A1 * | 5/2009 | Nishidate | ............... | H02K 1/148 310/216.055 |
| 2009/0160373 A1 * | 6/2009 | Katou | ....................... | B25F 5/02 318/286 |
| 2011/0024489 A1 * | 2/2011 | Sakakibara | ............ | B21D 28/26 234/1 |
| 2011/0260824 A1 * | 10/2011 | Fornage | .................. | H01F 30/10 336/220 |
| 2012/0153768 A1 * | 6/2012 | Sanji | ..................... | H02K 15/024 310/216.009 |
| 2012/0161568 A1 * | 6/2012 | Umemoto | .............. | H02K 55/04 310/198 |

FOREIGN PATENT DOCUMENTS

| | | | | |
|---|---|---|---|---|
| FR | 2636182 A1 * | 3/1990 | ................. | H02P 6/08 |
| GB | 393702 A * | 6/1933 | ............ | H02K 17/10 |
| JP | 2001037134 A * | 2/2001 | | |
| JP | 2002191141 A * | 7/2002 | | |

* cited by examiner

INVENTION
A= 557.84 mm2

PRIOR ART

INVENTION

SINGLE-PHASE SHADED POLE INDUCTION MOTOR, CONVERTIBLE TO PERMANENT MAGNET MOTOR

TECHNICAL FIELD

The present invention relates to electric motors manufacturing techniques within the electro-mechanical industry, and it is particularly related to a shaded-pole single-phase induction motor that can be converted into a permanent magnet motor, such design allows enhancing its energetic efficacy and better use of the construction materials.

BACKGROUND

As is well known, electric motors are apparatuses used to convert electric energy into mechanic energy using electro-mechanical means.

The operation of an electric motor can be achieved by two principles discovered by mid-nineteenth century. The first principle is the one about induction discovered by Faraday, which says that if a conductor is moved through a magnetic field an electric current is induced in such conductor. The second principle was observed by Ampere and it recites that if a current passes through a conductor localized in the interior of a magnetic field, the latter applies a mechanical force on the conductor.

For the motors to be operational they are provided with to basic units: the inductor which creates the magnetic field and the shell or armature which is the structure supporting the conductors that cut the magnetic field and carry the motor excitation current.

Depending on the type of electric energy used by the motors, these are classified into direct current motors and alternating current motors. Emphasizing alternating current motors, the existence of two types should be noted: synchronous motors and induction motors (asynchronous). In synchronous motors the magnetic field current is supplied by an alternating current power source, while in induction motors the magnetic field current is supplied to its windings by magnetic induction.

It is exactly from this feature that the induction motor gets its name, since the currents flowing in the rotor are induced by the currents flowing in the stator. The rotor currents are induced by the action of magnetic fields generated by the stator winding without the existence of an electric connection between the stator circuit and the rotor.

The induction motor stator comprises a frame housing a magnetically active cylindrical annular structure, a stack of punched laminations of electrical steel with a winding set placed in internal equidistantly spaced slots.

The induction motor rotor is a magnetically active cylindrical structure (laminations stacking), mounted on a shaft. The rotor winding may be of two types: squirrel-cage rotor or winded rotor. Squirrel-cage type rotors comprise a series of conductive bars (aluminum or copper) disposed between carved slots on the rotor periphery and short-circuited on each end by short-circuit rings (aluminum or copper). The squirrel-cage winding may be formed either by melting, pressure injection or by a manufacturing process. The design variation of the rotor bars is a primary method for altering the motor torque-speed features.

It has to be noted that single-phase induction motors have ignition difficulties. To overcome such inconvenience, an igniting capacitor responsible for offsetting the current to achieve the torque required for the rotor to start rotating may be used. Likewise, a shadow winding (also known as auxiliary or igniting winding) can be used, which differs physically and electrically from the main or operation winding since the latter is formed by a thinner conductor and has more loops than the igniting winding.

Induction motors with auxiliary windings (also known as shaded-pole) have the advantage of having a simple construction, high reliability and strength, apart from having a low manufacturing cost. In contrast to other single-phase induction motor types, such motors do not require auxiliary parts such as centrifugal capacitors or switches, which can be interpreted as minimal maintenance.

Despite the squirrel-cage type single-phase induction motors not having a large igniting torque, they are used in various applications, such as: ventilators, centrifugal pumps, fuel pumps, dusty environments applications, compressors, washing machines and home appliances in general, etc.

In relation to the aforementioned, improvements in electric motors construction and configuration have been implemented through the years in order to achieve better results regarding their energy consumption, especially in those single-phase induction motors.

An example of the aforementioned is the shaded-pole single-phase induction motor disclosed in the U.S. Pat. No. 2,773,999 characterized for having a rotor comprised by a plurality of small ring-short-circuited bars; a stator with four protruding poles, each of them having an identical shape; said shape formed by two portions: a neck portion and a face portion; said face portion comprises a first and a second part. The first part has a slot where a shadow winding is placed. Each of the second parts has a semi-flat or divergent surface that attaches to the cylindrical partial portion of the face portion in a given point. The semi-flat surfaces are preferably tangential to the cylindrical surfaces and are extended to the end of the faces sides.

The rotor has preferably a very small air gap compared to the face portions. However, since the rotor is cylindrical, the air gap is uniform in the adjacent zone to the first parts and adjacent to the main central portion of the face portions. However, a different air gap is formed adjacent to the semi-flat surfaces, which continuously increases toward the faces ends. Also, such semi-flat surfaces are preferably at 50 electrical degrees.

The afore mentioned motor presents the inconvenience of a circular geometric shape of the stator, whereby a great amount of material is wasted when performing the punching to obtain the final form, as it is part of a square-shape lamination. Another inconvenience is that the pockets formed between one pole and the other are ovoid-shaped, which limits the useful space to place the main winding of each pole.

Another example of the previously mentioned is the motor disclosed in U.S. Pat. No. 2,149,569 that is of the shaded-pole reversible type, which in combination comprises a stator comprising a plurality of magnetic material laminations; such laminations being open inside their marginal edges in order to define the rotor pocket surrounded by a plurality of symmetrically disposed rectangular-shaped poles; a rotor mounted on such pocket for inducing the rotation, which includes a magnetic cylindrical core that has a winding and a squirrel-cage configuration; the faces of such poles are integrally formed by such laminations in order to have a coherent shape with said rotor contour; U-shaped linking members of portions of highly permeable magnetic metal sheets alternately brazing and firmly fastening each pole with the legs of such linking members; the leg faces of such linking members coincide in shape and contour with such rotor; means for permanently shading some of the poles and means for energizing the main windings placed in each of the poles.

However, although the stator of the aforementioned motor has a square shape, there is not an optimization of the space pretended for the main windings, thus to achieve the necessary magnetic field a wire with a smaller size is used. Whereby such motor does not have efficient energy consumption, because the smaller a conductor area is, the bigger its resistance to the electric current flow will be.

Another shaded-pole induction motor of the state of the art is described in U.S. Pat. No. 2,591,117 which consists of a squirrel-cage rotor, a concentrically located stator about said rotor; said stator being symmetric and being divided into at least four protruding opposing poles which form radial air gaps with said rotor, each pole being separated from its adjacent pole by circumferential air gaps circumferential of at least 5% and no more than 15% of the length of the arched face of one of said poles, each of said poles having a portion of the stepped face to provide a further radial gap to gap; the cumulative curvature of said stepped portions of the pole faces being at least 20% of a full circle with which said pole faces coincide; the reluctance of said circumferential air gaps being substantially greater than the reluctance of the additional air gaps.

However, it presents the same inconveniences of the aforementioned motors; the stator configuration is not optimal because there is much punching material waste in addition to lacking a suitable surface for thermal energy transfer between the stator and the environment.

The motor pertaining to U.S. Pat. No. 3,697,842 is a single-phase induction motor which includes a stator core that has at least one pair of poles. Said poles comprise a first and a second portion, the first portion having a shadow coil on the remote side of the second portion with which sections with and without shadow are formed from the first portion of the pole. A first coil braces each of the poles and a second coil only braces the first portion of each pole. The first coils are connected in series to form a first winding and the second coils are also connected in series to form a second winding; both the first and second winding are connected in series.

A first speed responding switch is provided, which shows a first and a second position. When being in its first position, the switch is coupled to the first winding in order to energize by a source of alternating current to the motor and begin operating. The switch also operates while being on its second position when the motor reaches certain speed wherein the first winding and the second winding are coupled in series to energize by the source.

The aforementioned induction motor has the disadvantage of using a centrifugal switch to enable the first winding and the second winding once that such motor is operating. The use of such additional components such as the switch increases the final cost apart from requiring periodic maintenance in order to guarantee its correct operation.

In U.S. Pat. No. 5,036,237 another example of electric motor that comprises a shaded-pole electric motor that has a stator and a rotor which interact by an air gap can be found. Said stator has a protruding pole with an arrow neck and a wide pole base. The slot of the shadow coil extends into the protruding pole from the air gap and defines a portion of the pole shadow. The exposed side of the shadow portion is relatively continuous, as it comprises a shadow coil that has a side within the slot of the shadow coil and other side close to the pole opening but away from the exposed side. This enables isolation of the surface of the protruding pole in order to receive the stator winding.

It has the disadvantage that when the protruding poles are formed by two sections separate from one another by a certain distance, a greater area is obtained for the windings but the pole amount that can be radially disposed in the stator is greatly limited. When the stator is punched there is a waste of punched material that is not being used on the following steps of motor construction.

In the aforementioned patents, reference is made to a stator and a rotor wherein the stator is a module formed by a set o steel sheets stack, which have been punched or cut with a specific design in order to house, inside the pockets that are being punched, the magnet wire loops (winding), said pockets are characterized for being provided in a diagonal position relative to a square horizontal and vertical symmetrical axes. The stator lamination in this induction motors can be squared or round; however, the design of this type of motors presents the following inconveniences:

When the lamination is square type, the excess material of the corners does not help to improve the magnetic flow of the motor, and when the lamination is of circular type, it presents a sheet waste on the contour of its corners, considering that the punching is performed on a square sheet.

When the punched pockets are arranged in an aligned position with the corners of the square electric sheet, they don't allow increasing the free space area among the protruding poles in which the coil is inserted.

The useful area in the square lamination of a standard motor of the previous art (3.3 frame) and which forms the punched pockets for housing the "coil" presents an area of about 406.62 mm$^2$ which limits the area capacity for the winding.

Similarly, the useful area of the round lamination has a further reduced area, relative to the square, of about 318.18 mm$^2$.

Regarding the rotor, it consists of a set o electric grade steel sheets, with a smaller diameter than the internal diameter of the stator and with multiple punched slots, where the conductive bars are housed, which form the squirrel-cage of the previous art.

The applicant has developed a novel shaded-pole single-phase motor, that for a same external area size of the stator of the previous art and smaller stator lamination package width, i.e., by using less material for its manufacture and consequently lighter, supplies the same output power with a smaller electric energy consumption.

On the other hand, there are different techniques for the manufacture and design of motors that provide a motor with more efficient results, but which are more expensive to manufacture such as permanent capacitor motors. Because of its design, the motor of the present invention presents a smaller electric resistance on its coils as well as the use of waste material when punching the magnetic circuit; therefore, it allows providing a less expensive and more efficient motor than the shaded-pole motors of the previous art.

SUMMARY OF THE INVENTION

In order to overcome the disadvantages of the previous art, a shaded-pole induction motor convertible into a permanent magnet motor has been developed, which presents a novel configuration of the stator element which is characterized for presenting a square lamination and with protruding poles by 45° relative to the horizontal and vertical symmetry axes. This configuration shows new aspects compared to the traditional position of the protruding poles of the previous art, which is located precisely over the horizontal and vertical symmetry axes.

By being rotated 45°, the protruding poles allow achieving a reduction of electric losses on their windings and a reduction of operative temperature of both the stator element and the rotor element, which can be interpreted as an increase of the motor operation efficacy. Similarly, the reduction of the operative temperature of the stator element allows the use of plastic materials for its components.

OBJECTS OF THE INVENTION

Considering the shortcomings of the previous art, it is an object of the present invention to provide a shaded-pole induction motor convertible into a permanent magnet motor which has high energy conversion efficacy.

Another object of the present invention is to provide a shaded-pole induction motor convertible into a permanent magnet motor that is manufacturing and operating cost effective.

An additional object of the present invention is to provide a shaded-pole induction motor convertible into a permanent magnet motor that allows reusing waste material during punching.

A further object of the present invention is to provide a shaded-pole induction motor convertible into a permanent magnet motor which stator element requires a smaller lamination package width or a smaller amount of sheets for providing the same power as a conventional shaded-pole induction motor.

Still another object of the present invention is to provide a shaded-pole induction motor convertible into a permanent magnet motor that allows the use of plastic materials for the construction of the casings or caps thereof, due to minimal heating when operating.

The previous objects as well as other objects and advantages of the invention are achieved by a novel configuration of the stator element of the shaded pole induction motor convertible into a permanent magnet motor of the present invention, which is characterized by having a squared configuration of its lamination and with protruding poles by 45° in relation to the horizontal and vertical symmetry axes.

By being rotated by 45°, the protruding poles allow achieving a reduction of electric losses on their windings and a reduction of operative temperature of both the stator element and the rotor element, which can be interpreted as an increase of the motor operation efficacy and as the possibility to use plastic materials for its components.

BRIEF DESCRIPTION OF THE FIGURES

The novel aspects considered characteristic of the present invention will be particularly established in the appended claims. However, the advantages and other objects thereof will be better understood by the following detailed description of a specific embodiment when reference to the appended drawings is made, in which:

DETAILED DESCRIPTION OF THE INVENTION

Figure 1:
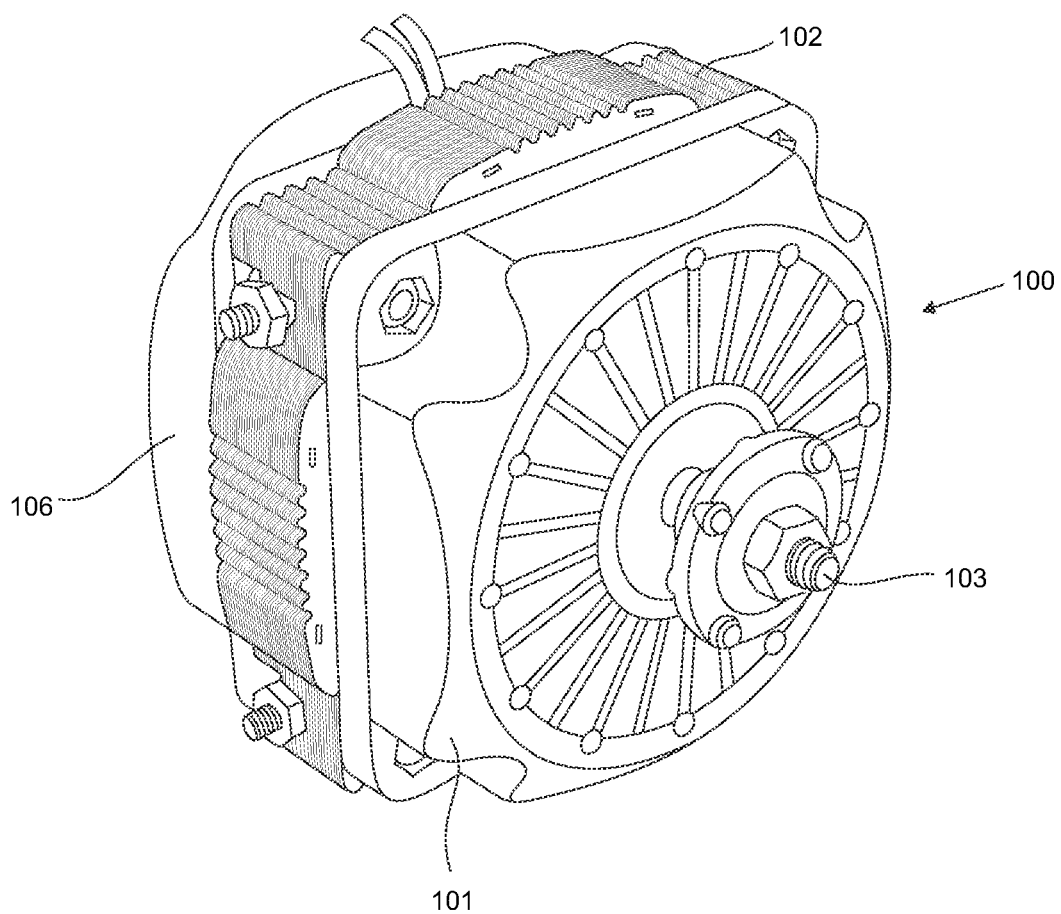
FIG. 1 is a front perspective view of a shaded pole induction motor convertible into a permanent magnet motor, constructed according to the principles of the present invention.
Figure 2:
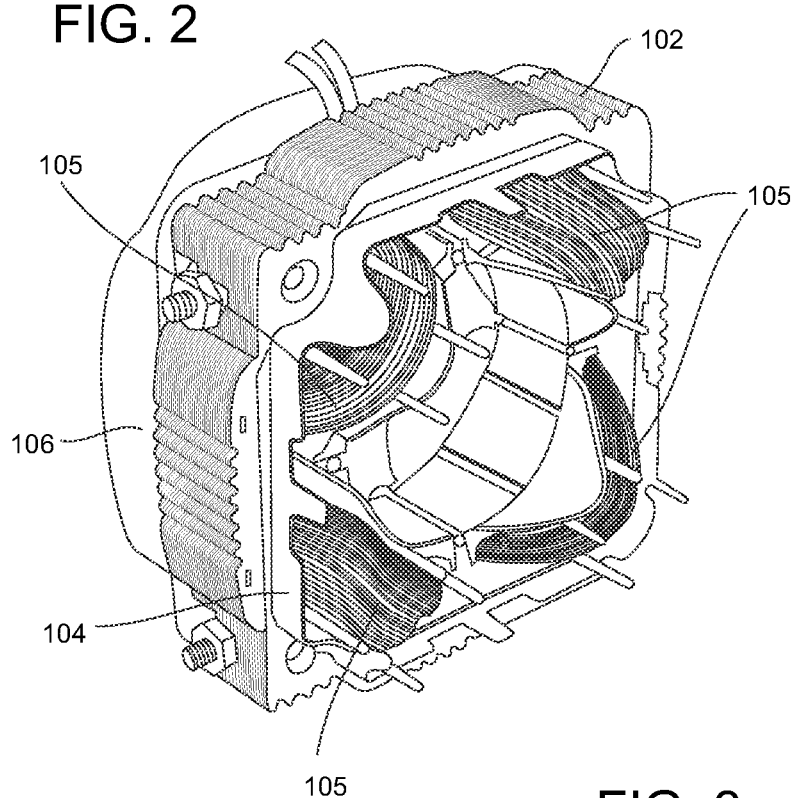
FIG. 2 is a front perspective view of the induction motor assembly of FIG. 1 without the front casing and without the rotor.
Figure 3:
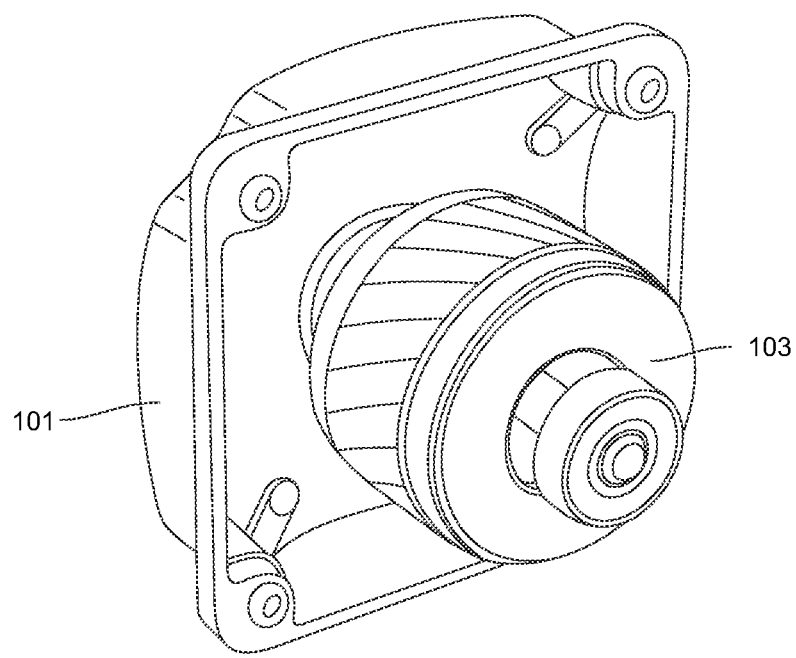
FIG. 3 is a perspective view of the inner portion of the induction motor front casing of FIG. 1 with the rotor assembled thereon.

Making reference to the accompanying drawings and further particularly to FIGS. 1 to 3 thereof, they show a shaded pole induction motor 100 convertible into a permanent magnet motor, constructed according to a particularly preferred embodiment of the present invention, which must be considered as illustrative but not limiting thereof, in which said shaded pole induction motor is a single-phase electric induction motor of fractional power with four shaded protruding poles, which comprises a front casing 101; a stator element 102; a rotor element 103; a pair of front 104 and rear 114 isolating jackets provided between the stator element 102 and the front 101 and rear 106 casings, respectively; a plurality of windings 105 placed over the four protruding poles of the stator element 102; and a rear casing 106.

Figure 4:
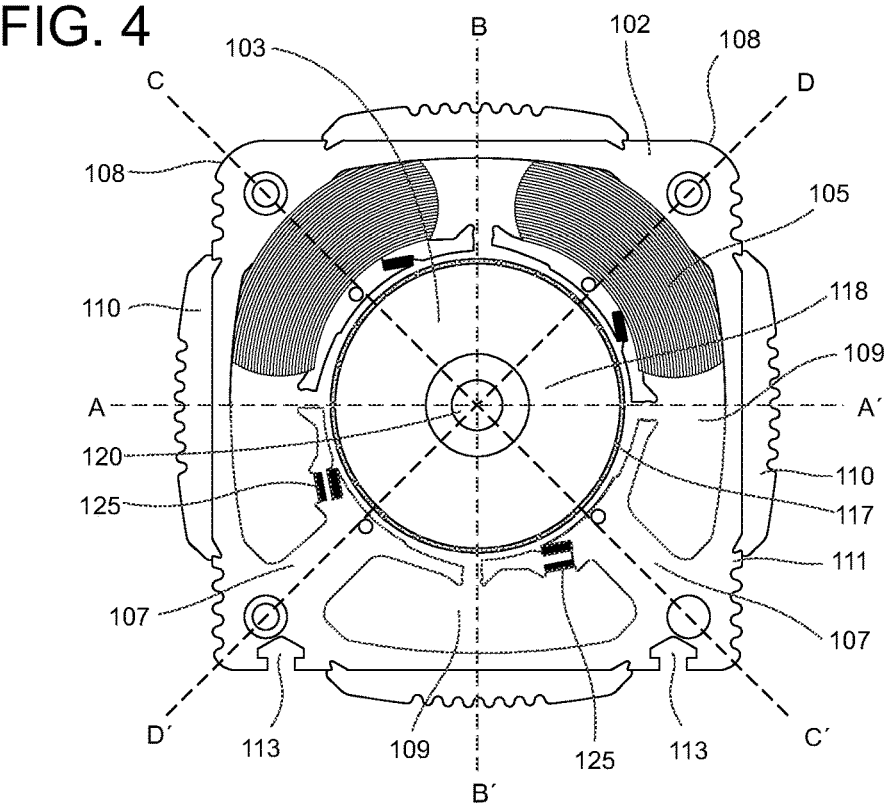
FIG. 4 is a front view of the induction motor of FIG. 1 without both casings (front and rear) and without the thermoplastic isolating jackets, in order to show the inner details of punching, assembly and shade coils of the stator element as well as the squirrel-cage type rotor element.

In FIG. 4 the novel configuration of the stator element 102 of the present invention is showed, which is characterized for showing a square shape lamination and with the stator element 102 protruding poles 107 being rotated by 45° relative to the horizontal A-A' symmetry axis and vertical B-B' symmetry axis. As can be seen, this configuration is novel in relation to the traditional position of the protruding poles of the previous art, which is precisely located over the A-A' and B-B' symmetry axes as can be observed in FIGS. 9C and 9D, where the configurations of the stators of the previous art are shown. The new configuration allows optimizing the use of the material of electric grad steel sheet during the manufacture and assembling of sheets packages of the stator element 102 and rotor element 103.

This position change by a 45° rotation allows to place the protruding poles 107 of the stator element 102 over the C-C' and D-D' diagonal axes crossing by exactly 45° the A-A' horizontal and B-B' vertical symmetry axes of the square shaped lamination.

Upon alignment of said protruding poles 107 toward the corners 108 of the stator element 102, the new design of the present invention allows for the punched pockets 109 to provide a bigger space to house the windings 105.

Providing a bigger area allows saving electric energy according to the principle of minimizing the Joule Effect $W=I^2 \times R$, due to the fact that a smaller caliber magnet wire may be used; and, therefore, with a bigger conductive area; since it is known, the bigger the area of a conductor is, the smaller resistance to electric current flow will have and consequently, the electric losses by Joule Effect will be reduced as well. Additionally, the possibility to increase the winding loops or turns is simultaneously obtained, which allows performing a better cost-benefit and efficacy balance to select the best winding according to the motor requirements; as well as to select the optimal coiling parameters.

Figure 12:
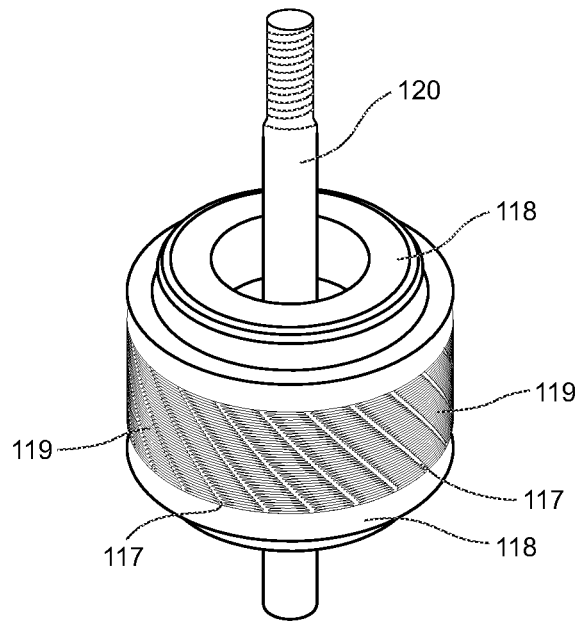
FIG. 12 is a perspective view of a squirrel-cage type rotor used in the induction motor of the present invention.

The lamination of the rotor element 103 of the present invention is characterized for having two embodiments, the first embodiment is shown in FIGS. 4 and 12 which correspond to squirrel-cage type rotor element 103 consisting of a plurality of conductive bars 117, a pair of short-circuited rings 118 placed with the plurality of conductive bars 117, a support body 119 and an arrow element 120 crossing the support body 119 by its center, both elements being firmly joined to one another. The rotor element 103 rotates while the motor operates due to the principle of electric currents induction induced by the magnetic field of the stator element 102, with a torque being thus generated.

Figure 5:
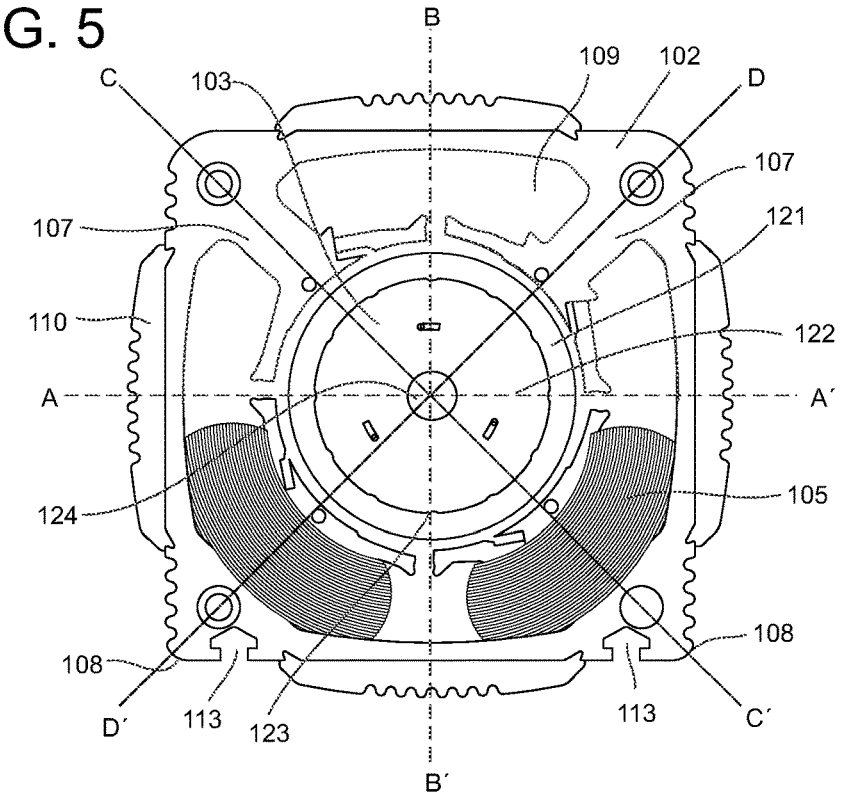
FIG. 5 is a front view of an additional embodiment of the electric motor showed in FIG. 1 without both casings (front and rear), without the thermoplastic isolating jackets and without the shade coils, in order to show the inner details of punching and assembly of both the stator element and the permanent magnet type rotor element.
Figure 13B:
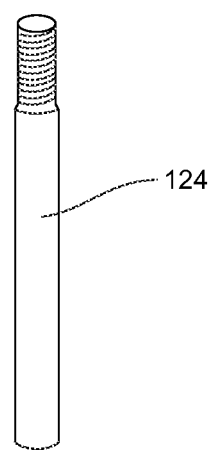
FIG. 13B is an exploded view of the permanent magnet type rotor showed in FIG. 13A.
Figure 13A:
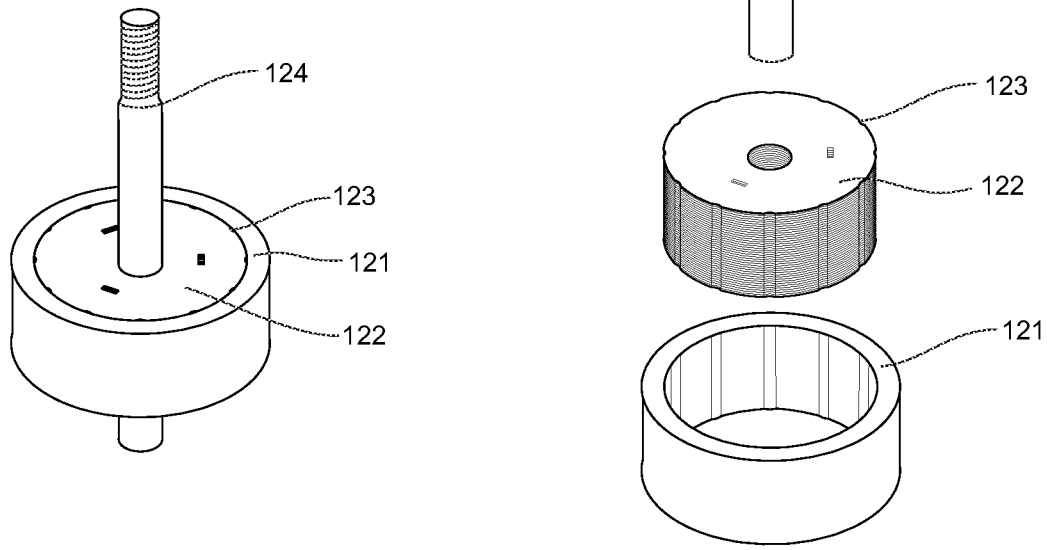
FIG. 13A is a perspective view of a permanent magnet type rotor used in the induction motor of the present invention.

The second embodiment is shown in FIGS. 5, 13A and 13B, which corresponds to a permanent magnet type rotor element 103 consisting of a permanent magnet ring 121, a support body or sheet 122 being inserted into the permanent magnet ring 121 and an arrow element 124 crossing the support body 122 by its center. The support body 122 further includes a plurality of striations 123 throughout its circumference, so as to be able to couple with the permanent magnet ring 121.

Figure 6A:
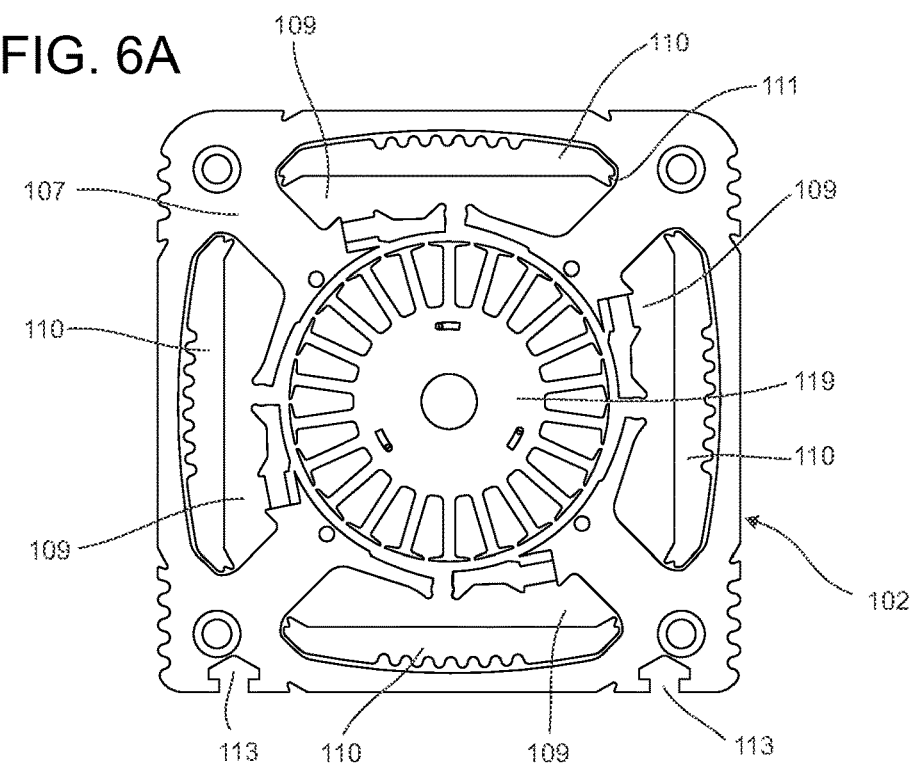
FIG. 6A is a plan view of a layoff for punching the induction motor squirrel-cage type rotor element and stator element of FIG. 1 where the inner punching details are showed.
Figure 6B:
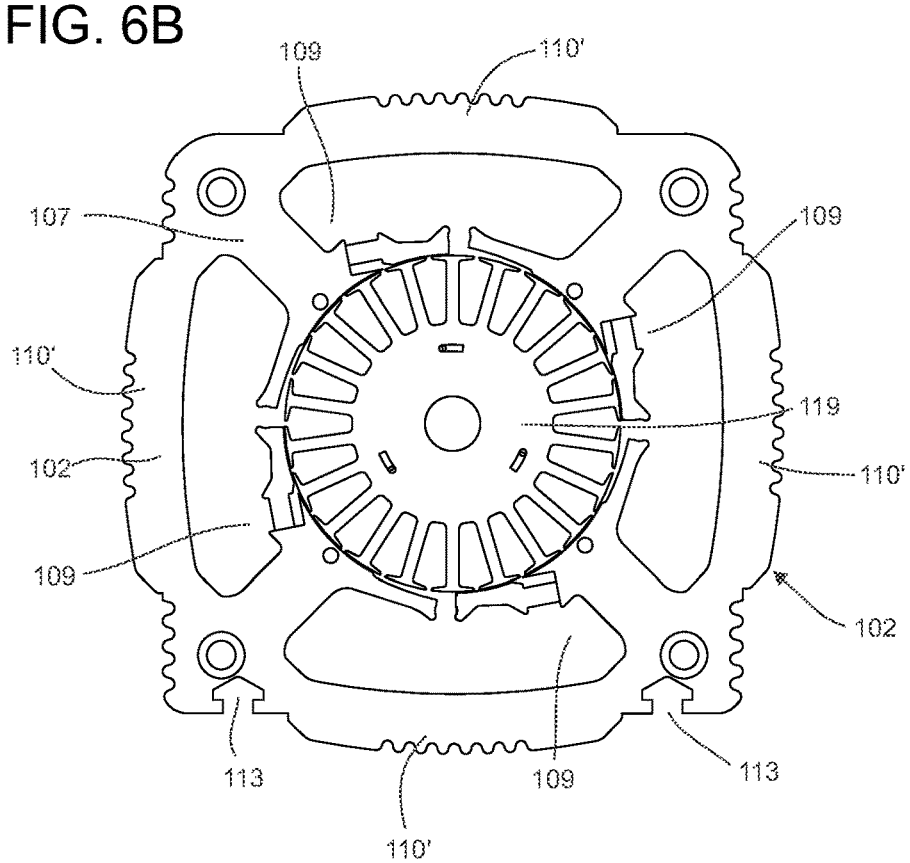
FIG. 6B is a plan view of an additional embodiment of the layoff for punching the induction motor squirrel-cage type rotor element and stator element showed in FIG. 6A.
Figure 7:
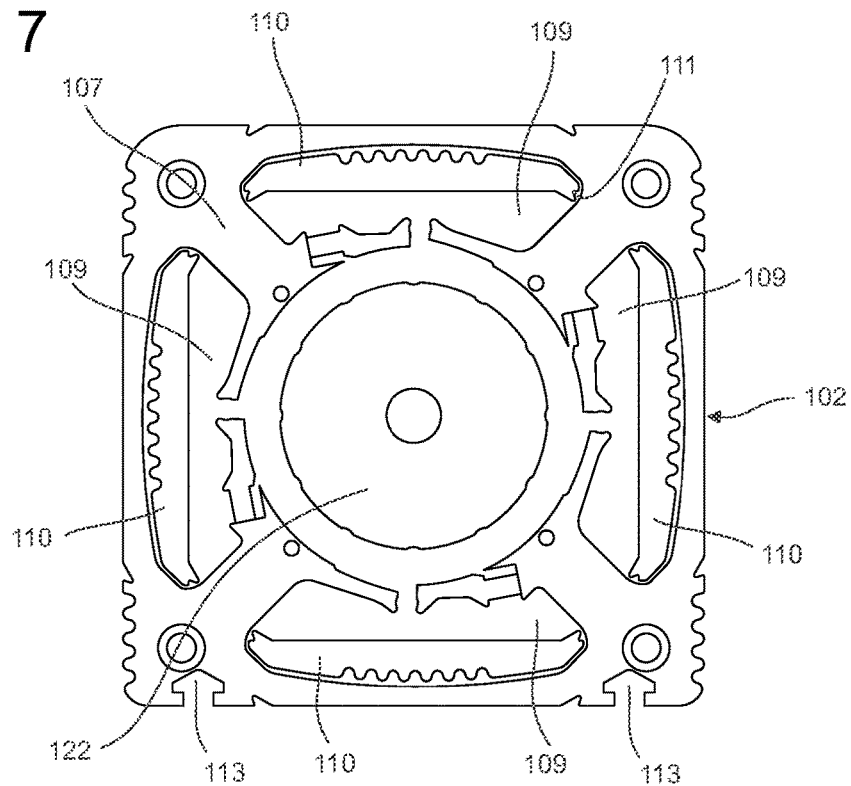
FIG. 7 is a plan view of a layoff for punching the permanent magnet motor rotor element and stator element of FIG. 5 where the inner punching details are showed.

Referring to FIGS. 6A, 6B and 7, they show layoffs for punching the stator element 102 and laminations 119 and 122 of the electric motor rotor element 103 both in its squirrel-cage type rotor embodiment (FIGS. 6A and 6B), and in its permanent magnet type rotor embodiment (FIG. 7) respectively.

The layoff design, being squared and with a 45° rotation of the protruding poles 107 of the stator element 102, relative to the horizontal symmetry axis A-A' and the vertical symmetry axis B-B', allows for optimization of the spaces and making the most of the remaining material for punching additional elements for the stator element 102.

Figure 8:
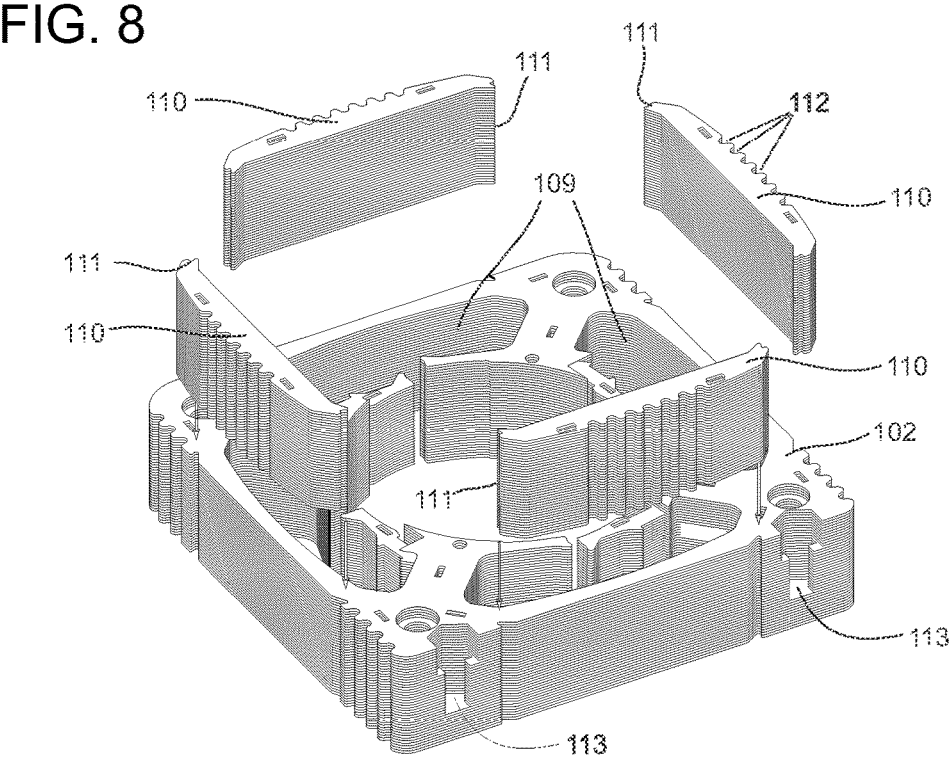
FIG. 8 is an exploded view of the electric motor stator element of the present invention once it has been punched and is ready for being assembled.

The new design allows the punched pockets 109 to provide greater space for the windings 105 to lodge (see FIGS. 4 and 7); in addition, some of the waste excess material from the electric steel sheet remains, and is used for punching an insert element 110, which couples with the stator element 102. The insert element 110 is assembled with the stator 102 by assembly elements 111, preferably of the tongue and groove type (see FIG. 8), in each of the four exterior sides of the stator 102, thus reinforcing and improving the magnetic circuit of said sides.

The above mentioned layoff design for punching allows, at the time of punching and assembling the stator element 102, obtaining an increase of the conductive cross-sectional area on the sides of said stator element 102, so as to improve conduction of the magnetic flow in said stator, while obtaining cost cuts in materials during manufacture of about 30% in steel sheet, with maximum optimization of the sheet, which directly reflects on production costs.

Regarding FIG. 6B, it shows an additional embodiment of the layoff for punching the stator element 102 and the electric motor rotor element 103. This layoff design is very similar to the one in FIGS. 6A and 7, but unlike these, insert elements 110' are integrated to the stator element body 102, thereby simplifying progressive punching.

In this embodiment, while the waste obtained by the space gained by a 45° rotation of the poles is not exploited, using C-C' and D-D axes considerably simplifies punching.

On the other hand, as mentioned above, in FIG. 8 the way that insert elements 110 and stator element 102 are assembled once they have been manufactured can be seen; as well as the manner by which punched pockets 109 are ready to receive the corresponding windings.

Likewise, insert elements 110 are designed with a plurality of undulations 112 on their external side face, which, when the motor is operating normally, are exposed to the environment, which allows increasing heat dissipation in the stator element 102, but mainly it allows decreasing magnetic circuit reluctance, obtaining a better magnetic flow, whereby losses by parasite currents or Eddy currents in the steel sheet are reduced; in addition, as mentioned above, there is better heat dissipation due to an increase of the heat dissipation area in undulated zones 112, which work as heat exchanging fins, with no additional material cost, thereby causing a working temperature reduction of the stator 102 and windings 105, which also translates into a reduction of electrical losses due to the working temperature decrease in said magnet wire windings 105.

As can be seen, novel configuration of stator element 102 allows obtaining a lower operative temperature in the motor, which gives the possibility of augmenting the rotor element 103 diameter. Having a greater diameter compared to motors from the previous art, the rotor element 103 also presents an operative temperature reduction and, as a consequence, there are less losses due to the Joule effect $W=I^2 \times R$ in said rotor element 103.

As the motor becomes more efficient, the wasted heat decreases and, therefore, the temperature difference between the motor and environment air temperature also decreases (temperature gradient). By having a colder working temperature both in the copper winding 105 of the stator element 102 and in the conductive bars of the rotor element 103, a lower ohmic resistance of the windings is achieved, since as it is well known, conductive materials change their ohmic resistance according to temperature, the higher the temperature, the higher copper and aluminum ohmic resistance will be, whereby the motor of the present invention, by not wasting electric energy which turns into heat, will have less losses caused by the Joule effect.

On the other hand, the stator element 102 of the present invention also includes as an additional characteristic that its configuration presents at least two punched holes 113 in two of its adjacent corners which work as a support base, one in each corner, to insert at least two fastening elements, preferably a pair of bolts so as to fasten the motor. This improvement in the stator 102 assembly enables the fastening elements to fix on a side face of the stator element 102, being able to be inserted therein, even when the motor is completely assembled; which enables choosing the option whether to use this type of fasteners to fix the motor to a base when required, thereby achieving a cost cut in fastening elements when they are not necessary. All the more, with this additional characteristic it is possible to substitute a conventional electric motor with an induction motor of the present invention in a system or machinery without the need of performing any modifications.

Figure 9A:
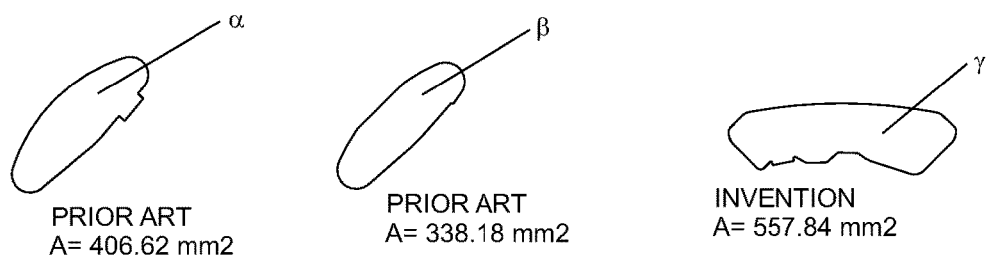
FIG. 9A is a plan view of the pockets where the windings are housed, where inner details of the previous art and details of the present invention are showed for shape and size comparison.

Regarding FIG. 9A, it shows configurations presented by free areas in pockets to place the winding in the conventional stator elements of the previous art, contrasting them against the free area obtained with the new punching configuration for the stator element 102 of the present invention.

Free area "α" corresponds to a squared lamination stator from the previous art with a free area for the winding of 406.62 mm².

Free area "β" corresponds to a round lamination stator from the previous art with a free area for the winding of 338.18 mm².

Free area "γ" corresponds to a squared lamination stator of the present invention, with protruding poles rotated 45° relative to horizontal and vertical symmetry axes, with a free area for the winding of 557.84 mm².

As can be observed, the novel configuration of the stator element 102 substantially increments the free area for the winding (section area useful to house the winding), in contrast with conventional stator configurations from the previous art, as can be seen in Table I:

TABLE I

AREA INCREMENT OF SECTION AREA USEFUL FOR WINDING BY 45° ROTATION OF PROTRUDING POLES

| | FREE AREA (FIG. 9A) | AREA INCREMENT OF (III) RELATIVE TO A (I) OR (II) IN (%) |
|---|---|---|
| I).- Conventional round lamination (standard average in the market with size "3.3 Frame") | β = 338.18 mm² | — |
| II).- Conventional squared lamination (standard average in the market with size "3.3 Frame") | α = 406.62 mm² | — |
| III).- New lamination of the invention (size "3.3 Frame") | γ = 557.84 mm² | (I) + 64.95% (II) + 37.18% |

Development of the stator element 102 of the present invention, that is to say, with protruding poles rotated 45° relative to horizontal and vertical symmetry axes, compared against the conventional stator from the previous art, either in squared punching or round punching, in addition to the increment in the section area useful for winding, has allowed to obtain unique and substantial benefits:

1. Waste generated in the corners during previous-art punching is harnessed; also, by rotating the position of the poles in the lamination puncher by 45°, the benefit of incrementing the space where the loops or coils of magnet wire is obtained, which allows for a better caliber selection of the magnet wire and an optimal selection of the number of turns in the poles loops.
2. Waste generated during the punching operation of pocket 109 for winding is harnessed. It is important to mention that this waste is turned into the insert element 110, which is added to the stator lamination as an element which helps in heat dissipation and magnetic flow conduction, benefiting the motor itself.
3. The stator element 102 with protruding poles characteristics can be used in the motor version with electronically switched permanent magnet type rotor.
4. It is a single-phase motor of shaded poles with better efficiency characteristics, in comparison with previous art motors of its type which are currently in the market.

Figure 9B:
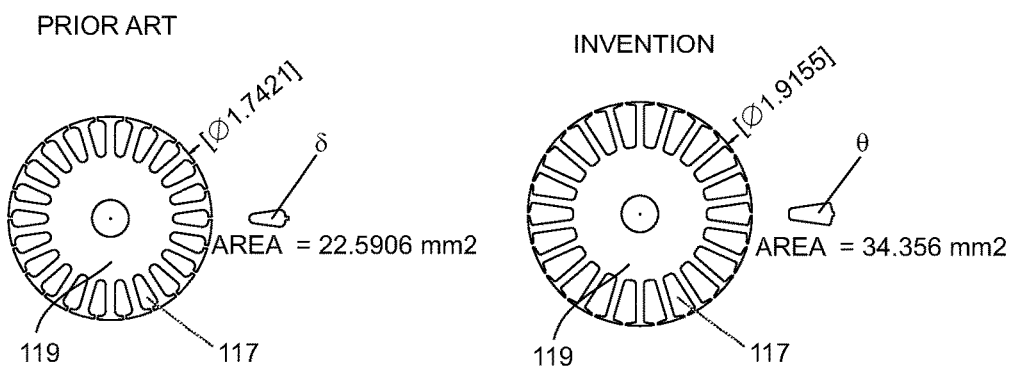
FIG. 9B is a plan view of the pockets shape and size where the rotor bars are housed, in which details of the previous art and details of the present invention are showed.

On the other hand, in FIG. 9B configurations presented by the free section area for conductive bars 117 of the previous art squirrel cage type rotor are shown, compared against the free section area for the rotor bars which is obtained with the new punching configuration for the rotor element 103 of the present invention. It can also be seen that for an electric motor with similar characteristics and the same power, due to energy efficiency of the stator element 102, a rotor element 103 of greater diameter which possesses less electrical losses can be employed.

Free area "δ" corresponds to a squirrel-cage type rotor, either of round lamination or squared lamination from the previous art, with a free area for the rotor bars of 22.5906 mm² and a diameter of 4.4249 cm.

Free area "θ" corresponds to a squirrel-cage type rotor of squared lamination according to the principles of the present invention, with a free area for the rotor bars of 34.356 mm² and a diameter of 4.8654 cm.

As can be seen, the novel configuration of the rotor element 103 substantially increments (up to 54%) the free area for the rotor bars, just as it is shown in FIG. 9B and in Table II, in addition to augmenting the external diameter of the rotor:

TABLE II

INCREMENT IN SECTION AREA FOR ROTOR BARS

| | FREE AREA (FIG. 9B) | AREA INCREMENT BETWEEN (I) AND (II) FOR CONDUCTIVE BARS OF THE ROTOR (%) |
|---|---|---|
| I).- Previous art rotor lamination | δ = 22.59 mm² | — |
| II).- New rotor lamination | θ = 34.35 mm² | +54% |

A very important aspect to consider is the improvement obtained in the induction motor efficiency of the present invention, by augmenting the area of the free spaces "8" for conductive bars of the rotor element 103 of squirrel cage type, without growing standard motor size, but actually incrementing the space (diameter) for the rotor.

By having a bigger free space "8" in the rotor element 103, the cross-section area of conductive bars 117 of the squirrel cage can be substantially augmented, thereby reducing their ohmic resistance and therefore the losses due to the Joule effect "$W=I^2 \times R$". In FIG. 9B it is observed that the free space "e" for the conductive bar 117 of the rotor of the present invention has an area of 34.356 mm², while the free space "δ" for the conductive bar 117 of the previous art conventional rotor only has 22.56 mm², namely, the rotor element 103 of the present invention has 52% more passage area relative to the previous art passage area.

Figure 9C:
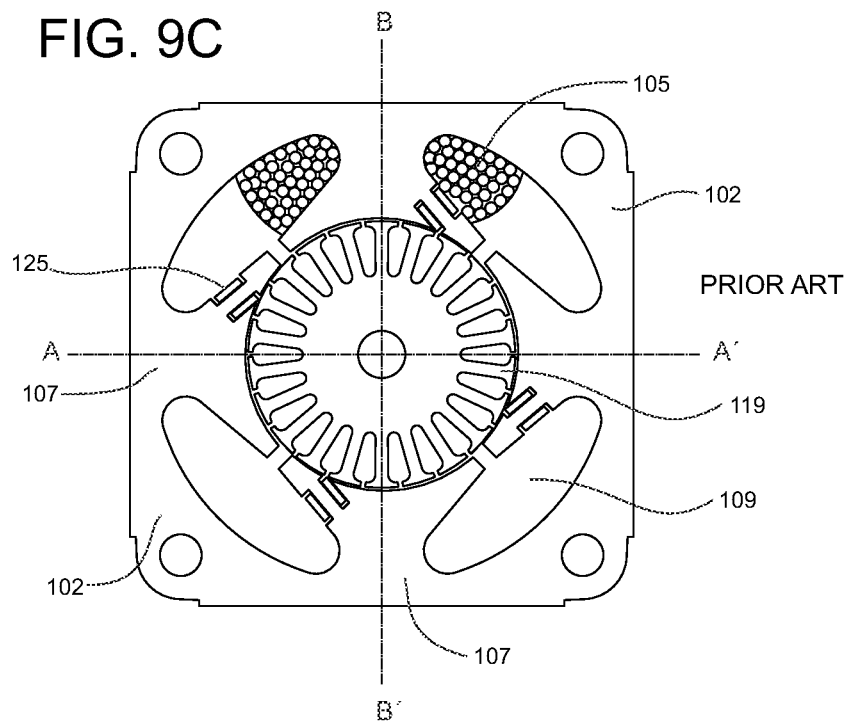
FIG. 9C is a plan view of the lamination punching of a square shape stator element of an induction motor of the previous art.
Figure 9D:
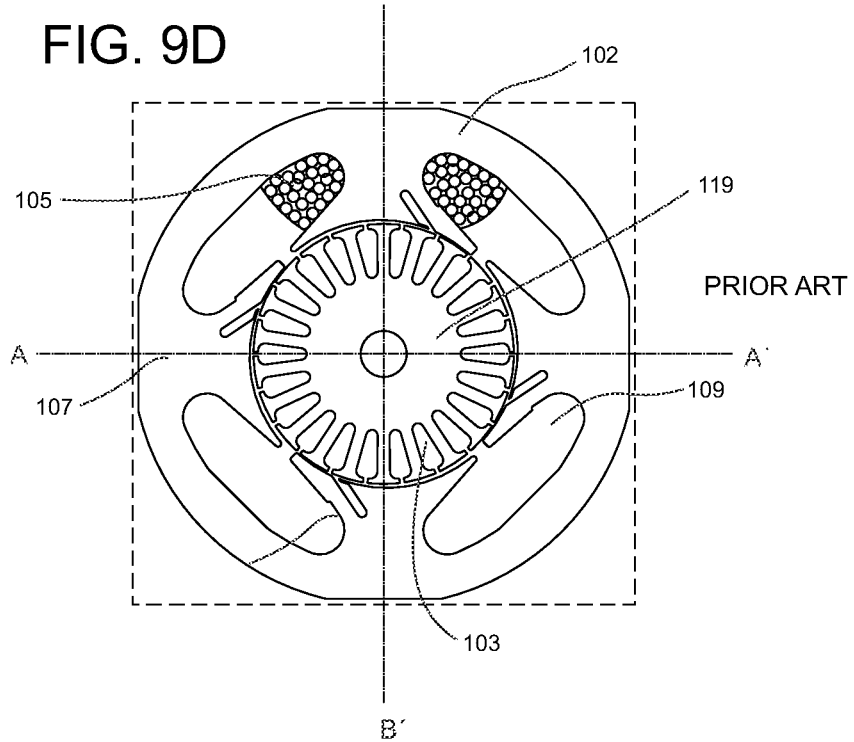
FIG. 9D is a plan view to show the punching of a round stator element lamination of a induction motor of the previous art.

Referring to FIGS. 9C and 9D, they show the puncher for lamination of two previous art different induction motors, in FIG. 9C a squared stator element 102 is shown and in FIG. 9D a round stator element 102 is shown, where it can be seen that the waste material generated by punching both stators from a single squared sheet of electric grade steel is not harnessed into some other motor component. The reduction in the free area 109 to place windings 105 of the stator element 102 while the protruding poles 107 are oriented can also be seen, precisely over the horizontal A-A' and vertical B-B' symmetry axes.

Figure 10:
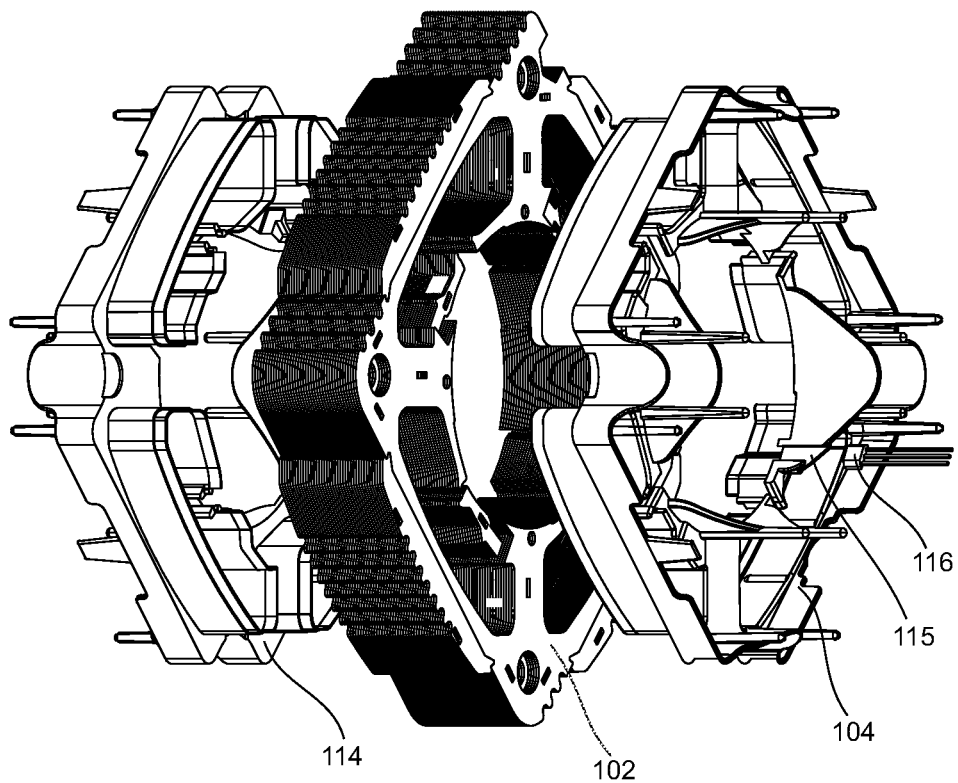
FIG. 10 is an exploded view of the stator and the top and bottom isolating jackets shown in FIG. 2.

Regarding FIG. 10, it shows frontal 104 and posterior 114 isolating jackets, manufactured with an isolating material, preferably with a thermoplastic material; the jacket 104 being disposed in the frontal part of the stator element 102; and the jacket 114 being disposed in the posterior part of the stator 102. Said isolating jackets further serve to contain and shape the winding, which allows achieving a loop or half turn possible minimum length. Additionally, the frontal isolating jacket 104 includes a pocket 115 to house a sensor element 116 of Hall Effect, for the embodiment in which the motor operates with the permanent magnet rotor.

Figure 11:
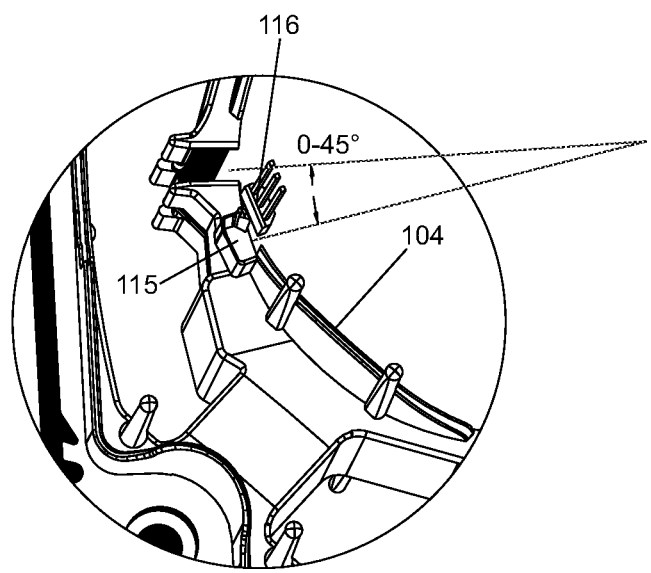
FIG. 11 is a top perspective view of a partial cut-out of the installation of a Hall Effect sensor element in the top isolating jacket.

In FIG. 11 the location of the sensor element 116 of Hall Effect, which is situated in an angular position at a variable gap range from 0° up to 45° of advancement relative to the magnetic pole is shown in detail. In a preferred embodiment, said sensor element 116 is advanced about 17° relative to the magnetic pole, which enables choosing an optimal advanced shot angle as a function of motor best efficiency.

Sensor element 116 is employed for measuring intensity of magnetic fields giving the possibility of performing an adjustment to the turning off and on of the coils by a gap in the control signal time, thus increasing efficiency and motor power.

The sensor position in the art is at 0°, namely, in the neutral point between the two poles, which only enables delaying the turning on of the coils; while the invention of the present invention (new art), allows delaying or advancing the turning on of the coils by programming a microprocessor, which is installed in a control card. The microprocessor allows the introduction of a control program to maintain motor efficiency.

Regarding FIGS. 12, 13A and 13B, they show details of lamination of the rotor element 103 of the present invention, which is characterized by having two embodiments.

The first embodiment is shown in FIG. 12, which corresponds to a squirrel-cage type rotor element 103, which, as mentioned above, consists of a plurality of conductive bars 117, a pair of short-circuited rings 118 placed with the plurality of conductive bars 117, a support body 119 and an arrow element 120 crossing the support body 119 by its center, both elements being firmly joined to one another. The rotor element 103 rotates due to the principle of induction of electric currents induced by the magnetic field of the stator element 102, with a torque being thus generated. Both the conductive bars 117 and the couple of rings 118 are manufactured with metal material preferably employing pressure injected aluminum (die casting), while the arrow element 120 is preferably manufactured with steel.

The second embodiment is shown in FIGS. 13A and 13B, which correspond to a permanent magnet type rotor element 103, which consists of a permanent magnet ring 121, a support body 122 being inserted into the permanent magnet ring 121 and an arrow element 124 crossing the support body 122 by its center. The support body 122 further includes a plurality of striations 123 throughout its circumference, so as to be able to couple with the permanent magnet ring 121. In this embodiment, shade coils 125 are eliminated from the stator element 102 (see FIG. 5).

According to the above, it will be possible to observe that the design of the induction motor 100, subject of the present invention, incorporates a novel stator element 102, which can operate both with squirrel cage type motors and with electronically switched permanent magnet type motors.

For this permanent magnet type of motors, the motor 100 should include an electronic control card (not shown in the figures), which may or may not include feedback from a sensor element 116 of Hall Effect like the one shown in FIGS. 10 and 11, described above. Likewise, the electronically switched motor 100 can also be used without the sensor element 116, such that the position of the magnetic fields is determined by computer algorithms previously stored in the electronic control card, thus determining the optimum shot time or angle for shooting the signal which turns one of the coils off and on.

It is worth mentioning that electronically switched permanent magnet motors turn out to be more efficient in their operation than shaded poles induction motors, since neither the losses generated by the shade coils 125 nor the electrical losses generated by losses in the rotor element 103 of the squirrel cage type are there.

EXAMPLES

Experiment I

A shaded poles induction motor of the present invention (Motor ROBEL Q9-580-690-27-312) and one of the best motors of its type and category from the state of the art available in the market (Motor ELCO NU9-20-2) were subjected to a series of tests to measure energy consumption and angular velocity at the same work load. The obtained values were compared and the following conclusion was reached:

The new induction motor compared to the previous art motor, presents an average saving of about 55% in electric energy consumption.

Experiment II

An electronically switched motor of the present invention (Motor ROBEL ECMQ 16WO) and one of the best motors of its type and category from the state of the art existing in the market (Motor A.O. SMITH E128044 16WO) were subjected to a series of tests to measure energy consumption and angular velocity at the same work load. The obtained values were compared and the following conclusion was reached:

The electronically switched motor (permanent magnet) of the present invention, compared against the electronically switched motors of their same capacity, presents savings of up to about 28.82% in energy consumption.

Experiments Development

For both experiments the comparative test consisted in tabulating and plotting the results of the energy consumption measurement and angular velocity measurement tests to which the motors of the present invention were subjected (ROBEL Q9-580-690-27-312 and ROBEL ECMQ16WO), comparing them against the results of the energy consumption measurement and angular velocity measurement tests to which the motors of the current art were subjected (ELCO NU9-20-2 and A.O. SMITH E128044) using the same work load for both types of motors by rotating a blade or propeller of identical characteristics.

In the case of induction motors (experiment I) a blade of 203.2 mm×30° coupled to the motor was utilized; and in the case of electronically switched motors (experiment II) a blade of 254 mm×30° coupled to the motor was utilized.

The points assessed at a determined scale and with working voltage ranges were the following:

a).—Energy consumptions in WATTS; and, b).—Motor angular velocity in revolutions per minute (RPM).

Figure 14:
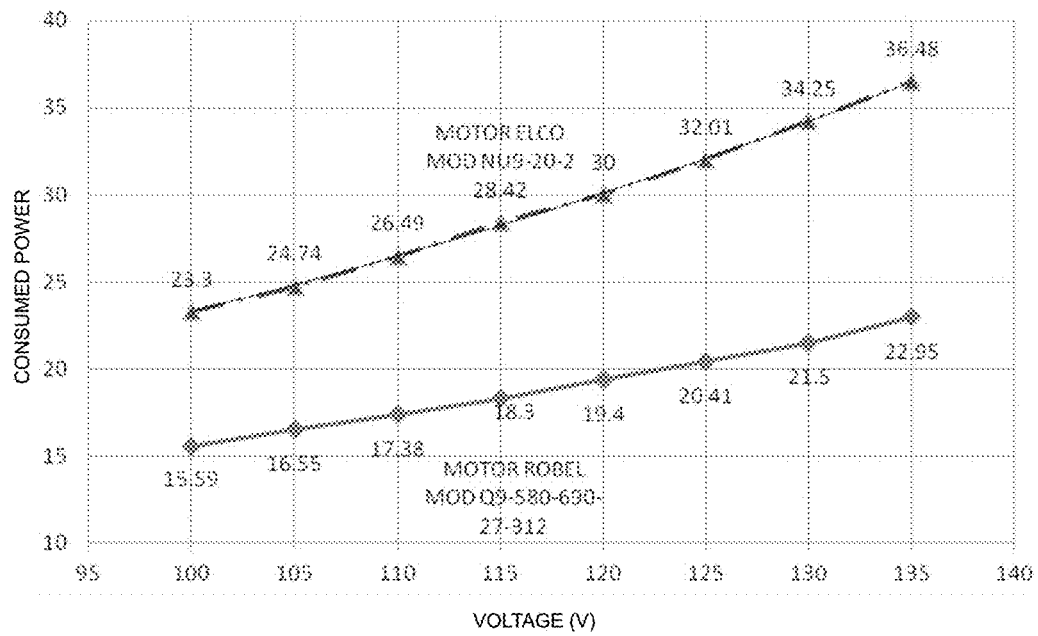
FIG. 14 shows the results of energy consumption measurement test to which a motor according to the principles of the present invention (ROBEL Q9-580-690-27-312) was subjected, comparing it against the results of the energy consumption measurement test to which a motor of the current art (ELCO NU9-20-2) was subjected.
Figure 15:
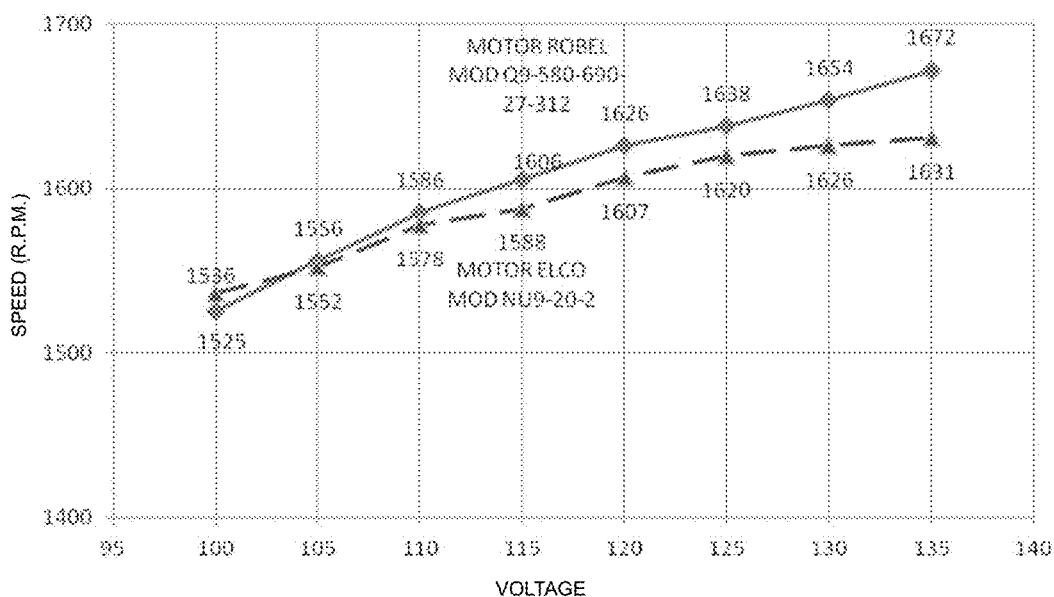
FIG. 15 shows the results of angular velocity measurement test to which the ROBEL Q9-580-690-27-312 motor was subjected, comparing it against the results of the angular velocity measurement test to which the ELCO NU9-20-2 motor was subjected.
Figure 16:
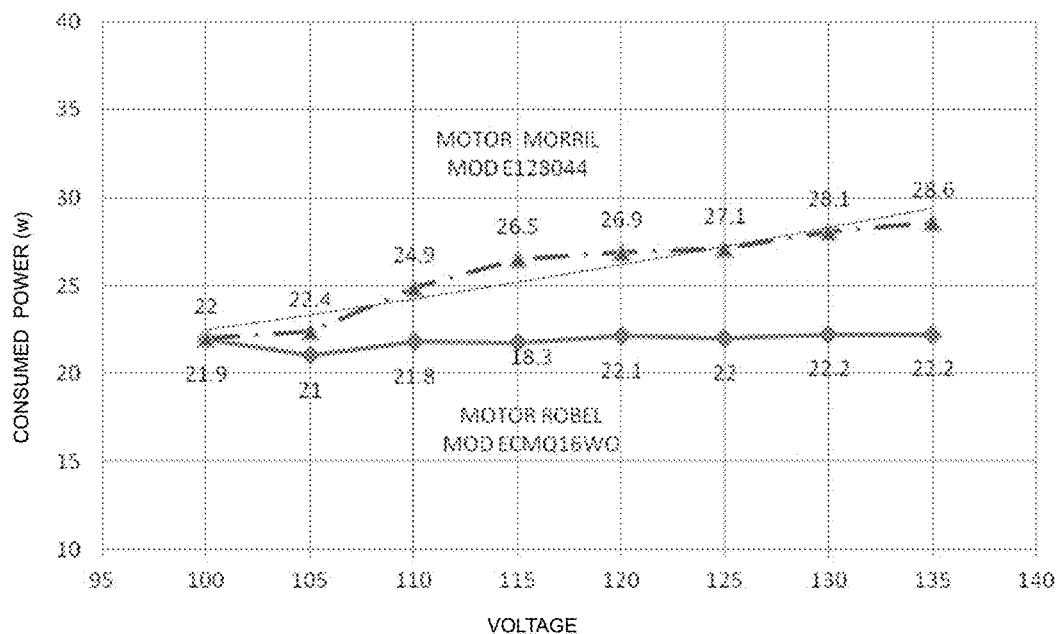
FIG. 16 shows the results of energy consumption measurement test to which a motor according to the principles of the present invention (ROBEL ECMQ16WO) was subjected, comparing it against the results of the energy consumption measurement test to which a motor of the current art (A.O. SMITH E128044) was subjected.
Figure 17:
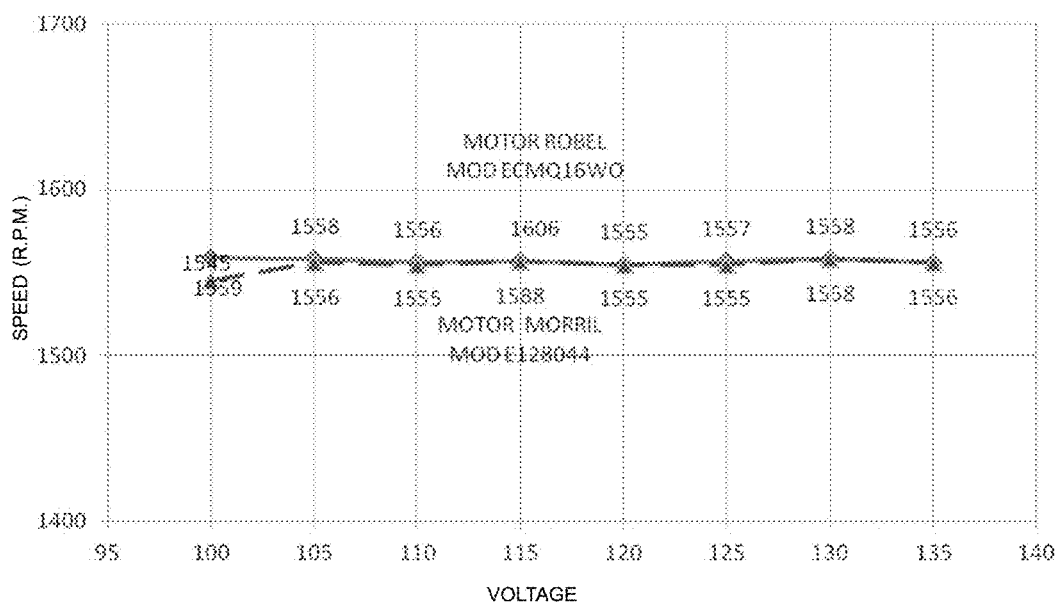
FIG. 17 shows the results of angular velocity measurement test to which the ROBEL ECMQ16WO motor was subjected, comparing it against the results of the angular velocity measurement test to which the A.O. SMITH E128044 motor was subjected.

The results obtained for induction motors (experiment I) are shown in Tables III and IV and in FIGS. 14 and 15; while for electronically switched motors (experiment II), the results are shown in Tables V and VI and in FIGS. 16 and 17.

TABLE III

MOTOR ROBEL 1/70HP MODEL Q9-580-690-27-312
LAMINATION PACKAGE WIDTH 14.73 mm (0.580 inches)
BLADE OR PROPELLER OF 203.2 mm (8 inches) × 30°, 5 SHOVELS

| VOLTAGE VAC | CURRENT I | POWER CONSUMED W | REVOLUTIONS RPM |
|---|---|---|---|
| 100 | 0.248 | 15.59 | 1513 |
| 105 | 0.252 | 16.55 | 1556 |
| 110 | 0.256 | 17.38 | 1586 |
| 115 | 0.261 | 18.30 | 1606 |
| 120 | 0.268 | 19.40 | 1626 |
| 125 | 0.276 | 20.41 | 1638 |
| 130 | 0.286 | 21.50 | 1654 |
| 135 | 0.296 | 22.95 | 1672 |

TABLE IV

MOTOR ELCO 1/70HP MODEL NU9-20-2
LAMINATION PACKAGE WIDTH 19.05 mm (0.750 inches)
BLADE OR PROPELLER OF 203.2 mm (8 inches) × 30°, 5 SHOVELS

| VOLTAGE VAC | CURRENT I | CONSUMED POWER W | REVOLUTIONS RPM |
|---|---|---|---|
| 100 | 0.345 | 23.30 | 1536 |
| 105 | 0.356 | 24.74 | 1552 |
| 110 | 0.368 | 26.49 | 1578 |
| 115 | 0.382 | 28.42 | 1588 |
| 120 | 0.393 | 30.00 | 1607 |
| 125 | 0.407 | 32.01 | 1620 |
| 130 | 0.423 | 34.25 | 1626 |
| 135 | 0.439 | 36.48 | 1631 |

From the results obtained in both tables, it can be seen that motor ELCO NU9-20-2 attached to a blade of 203.2 mm (8 inches×30°) and 5 shovels, consumes more energy than motor ROBEL Q9-580-690-27-312 in all tests carried out when they are subjected to the same predetermined voltage. For instance, by applying a voltage 115 VAC, motor ELCO NU9-20-2 consumes 28.42 Watts of energy and makes the blade spin at an angular speed of 1588 revolutions per minute (RPM), while motor ROBEL Q9-580-620-27-312 attached to the same size of blade, by applying a 115 VAC voltage consumes 18.3 Watts of energy and makes it spin at an angular speed of 1606 RPM.

The results shown in tables III and IV and depicted in FIGS. 14 and 15 were obtained as it was mentioned above, assessing the performance of each approved motor, using the same workload, that is, a five-shovel blade with a diameter of 203.2 mm (8 inches×30°) at the pointed out different voltages.

As it can be observed, the motor of the present invention (ROBEL Q9-580-620-27-312) consumes less current, less energy and produces a greater angular speed than the state of the art motor (ELCO NU9-20-2). Both motors being designed to do the same job give a power of 9 W; however, they present differences in their consumptions, therefore it can be determined from the obtained results that the new motor is more efficient in its performance.

From tables III and IV, it can also be observed that the lamination package width of motor ELCO NU9-20-2 is of 19.05 mm (0.750 inches), while for the motor of the present invention, the lamination package width is 14.73 mm (0.580 inches), which enables obtaining a cost cut in the lamination package width of 4.31 mm (0.170 inches). In view of the above mentioned, it can also be concluded that the prior art stators use 29% more of the material in their lamination.

On the other hand, using a five-shovel blade with a 30° angle for both cases, the motor of the present invention (ROBEL Q9-580-690-27-312) with an output capacity of /70 HP (9 Watts) presents a voltage of 115 VAC and a consumption of about 18.3 Watts, giving 1606 RPM, while the state of the art motor (ELCO NU9-20-2) with an output capacity 1/70 HP (9 Watts) presents a voltage of 115 VAC and a rough consumption of 28.42 Watts, giving 1588 RPM, which results in 55.30% more of the electric energy consumption and 1.13% less RPM compared with the motor of the present invention.

With the obtained results in the completed tests and shown in tables I and II, as well as what can be noted in FIGS. 14 and 15, it can be concluded that motor ELCO NU9-20-2 consumes about 55% more energy than motor ROBEL Q9-580-620-27-312 and gives a slightly minor power.

TABLE V

MOTOR ROBEL ECMQ16WO
LAMINATION PACKAGE WIDTH 19.05 mm (0.750 inches)
BLADE OR PROPELLER OF 254 mm (10 inches) × 30°, 5 SHOVELS

| VOLTAGE VAC | CURRENT I | POWER CONSUMED W | REVOLUTIONS RPM |
|---|---|---|---|
| 100 | 0.681 | 21.9 | 1559 |
| 105 | 0.675 | 21 | 1558 |
| 110 | 0.676 | 21.8 | 1556 |
| 115 | 0.679 | 21.7 | 1557 |
| 120 | 0.657 | 22.1 | 1555 |
| 125 | 0.658 | 22 | 1557 |
| 130 | 0.672 | 22.2 | 1558 |
| 135 | 0.662 | 22.2 | 1556 |

TABLE VI

MOTOR A.O. SMITH E128044 16WO
LAMINATION PACKAGE WIDTH 19.05 mm (0.750 inches)
BLADE OR PROPELLER OF 254 mm (10 inches) × 30°, 5 SHOVELS

| VOLTAGE VAC | CURRENT I | CONSUMED POWER W | REVOLUTIONS RPM |
|---|---|---|---|
| 100 | 0.6 | 22 | 1545 |
| 105 | 0.597 | 22.4 | 1556 |
| 110 | 0.595 | 24.9 | 1555 |
| 115 | 0.584 | 26.5 | 1557 |
| 120 | 0.589 | 26.9 | 1555 |
| 125 | 0.581 | 27.1 | 1555 |
| 130 | 0.587 | 28.1 | 1558 |
| 135 | 0.584 | 28.6 | 1556 |

From the results obtained in both tables, it can be seen that motor A.O. SMITH E128044 16WO attached to a blade of 25.4 cm (10")×30° and 5 petals, consume more energy than motor ROBEL Q9-580-690-27-312 in almost all tests carried out when they are subjected to a same predetermined voltage. For instance by applying a 115 VAC voltage, motor A.O. SMITH E128044 16WO consumes 26.50 watts of energy and makes the blade spin at an angular speed of 1557 revolutions per minute (RPM), while motor ROBEL ECMQ 16WO attached to the same size of blade, by applying a 115 VAC voltage, consumes 21.7 watts of energy and makes it spin at an angular speed of 1557 RPM.

The results shown in tables V and VI and depicted in FIGS. 16 and 17 were obtained as above mentioned, assessing the performance of each approved motor, using the same workload, that is, a five-shovel blade with a diameter of 254 mm (10 inches×30°) at the pointed out different voltages.

As it can be noted, the motor of the present invention (ROBEL ECMQ 16WO) consumes less energy, a little more current and it produces an angular speed practically equal to the state of the art motor (A.O. SMITH E128044 16WO).

From tables V and VI it can also be observed that the lamination package width both, of motor A.O. SMITH E128044 16WO, as well as of motor ROBEL ECMQ 16WO is of 19.05 mm (0.750 inches).

On the other hand, using a five-shovel blade with a 30° angle for both cases, the motor of the present invention (ROBEL ECMQ 16WO) presents a voltage of 115 VAC, a consumption of about 21.7 Watts, giving 1557 RPM, while the state of the art motor (A.O. SMITH E128044 16WO) presents a voltage of 115 VAC, a rough consumption of 26.45 Watts, giving 1557 RPM, which gives the result of additional 21.88% of electric energy consumption, compared with the motor of the present invention.

With the obtained results in the completed tests and shown in tables V and VI, as well as what it is observed in FIGS. 16 and 17, it can be determined that motor A.O. SMITH ELCO NU9-20-2 consumes up to about 28.82% more energy than motor ROBEL ECMQ 16WO and gives practically the same power.

As it can be noted, tables III, IV, V, and VI show values obtained by subjecting the induction and electronically switched motors of the present invention, as well as the aforementioned state of the art motors, to the corresponding tests, results of which allow to objectively show and give a clear idea of the energy consumption conservation achieved with induction and electronically switched motors of the present invention.

In addition, it is also important to mention that the electric motor of the present invention in its squirrel-cage type rotor embodiment, presents an efficiency between 38% and 50%, while in the permanent magnet embodiment its efficiency exceeds 70%. The conventional state of the art induction motors only have an efficiency between 18% and 28%, while conventional electronically switched motors present an efficiency from 55% to 65%.

On the other hand, relative to punched electric grade sheets, as it was already mentioned, depending on the motor power, the number of sheets is reduced or increased (lamination package) in the stator and the rotor. It is important to mention that the lamination package width can modify the motor efficiency.

Additionally, the thinner the sheet width is, the better characteristics the motor will have, presenting minor losses generated by parasite currents or Eddy currents. The customary minimum width is 0.50 mm.

The shaded-pole induction motor convertible into a permanent magnet motor, which is the object of the present invention, allows for a better energetic efficiency due to its new design, since the electric resistance of the stator and rotor winding is reduced, whereby electric losses are also reduced by the Joule effect.

Another very important characteristic of both versions of motors is that the size of the motor does not vary with a new design of the induction motor, keeping its standard size for this type of motors.

The main application of this kind of motors is found in refrigerators of commercial type for convenience stores, ice-cream parlors, restaurants, or retail stores, etc.; or in the industry that provides vent, heating, and air conditioning systems (HVAC), which are totally compatible with the characteristics and arrangement of the state of the art electric motors, which allows for modifications and substitutions without making any changes to the equipment or system where it is to be placed.

Even when in the prior description the preferred embodiments of the present invention have been described and shown, emphasis should be made on the fact that numerous modifications can be made thereto, such as using the design of the motor of the present invention for motors of different sizes, capacities and power, without departing from the actual scope of the invention; therefore, the present invention should not be restricted, except for what the prior art and the attached claims require.

The invention claimed is:

1. A shaded-pole single-phase induction motor convertible into a permanent magnet motor of the type that comprises: a front casing, a stator element, a rotor element, a plurality of windings placed over the protruding poles of the stator element, and a rear casing, wherein the stator element presents a square configuration with the four protruding poles rotated by 45° relative to the horizontal and vertical symmetry axes in order to be aligned with the four corners of the stator element, the stator element configuration providing a free area for housing the windings, wherein the motor comprises insert elements which couple the stator element in each of the four exterior sides of the stator element, and wherein said insert elements are formed by punching waste excess material obtained after punching the free area for housing the windings.

2. The shaded-pole single-phase induction motor according to claim 1, wherein the free area for housing the windings is of at least 500 mm$^2$.

3. The shaded-pole single-phase induction motor according to claim 1, wherein the free area for housing the windings is of 557.84 mm$^2$.

4. The shaded-pole single-phase induction motor according to claim 1, wherein the insert elements are assembled in each of the four exterior sides of the stator by assembly elements located on the sides of the insert elements.

5. The shaded-pole single-phase induction motor according to claim 4, wherein the assembly elements are of the tongue and groove type.

6. The shaded-pole single-phase induction motor according to claim 1, wherein the insert elements include a plurality of undulations on their external side face.

7. The shaded-pole single-phase induction motor according to claim 1, wherein the insert elements have a smooth external side face.

8. The shaded-pole single-phase induction motor according to claim 1, wherein the stator element includes at least two punched holes in two of its adjacent corners which work as a support base, one in each corner, to insert at least two fastening elements so as to be able to fasten the motor.

9. The shaded-pole single-phase induction motor according to claim 8, wherein the fastening elements are screws.

10. The shaded-pole single-phase induction motor according to claim 1, wherein the configuration of the stator element further provides a greater free space for the rotor element.

11. The shaded-pole single-phase induction motor according to claim 10, wherein the configuration of the stator element admits such a rolling diameter of the rotor element that it allows greater motor efficiency.

12. The shaded-pole single-phase induction motor according to claim 11, wherein the free space for the rotor element is of at least 30 mm$^2$.

13. The shaded-pole single-phase induction motor according to claim 10, wherein the rotor element is of the squirrel cage type comprising a plurality of conductive bars, a pair of rings short-circuited with the plurality of conductive bars, a support body and an arrow element crossing the support body through the center.

14. The shaded-pole single-phase induction motor according to claim 13, wherein the configuration of the stator element increases an area of free spaces for the rotor conductive bars, which allows greater motor efficiency.

15. The shaded-pole single-phase induction motor according to claim 10, wherein the rotor element is a permanent magnet rotor element.

16. The shaded-pole single-phase induction motor according to claim 15, wherein when the motor operates with the permanent magnet rotor element, it includes a front isolating jacket including a cavity to house a Hall Effect sensor element.

17. The shaded-pole single-phase induction motor according to claim 16, wherein the Hall Effect sensor element is located in an angular position at a variable gap range up to 45° of advancement relative to the magnetic pole.

18. A shaded-pole single-phase induction motor according to claim 15, wherein the Hall Effect sensor element is advanced about 17° relative to the magnetic pole.

19. The shaded-pole single-phase induction motor according to claim 10, wherein it includes a pair of isolating front and rear jackets disposed between the stator element and the front and rear casings respectively.

20. The shaded-pole single-phase induction motor according to claim 19, wherein the isolating jackets further serve to contain and shape the winding.

* * * * *